R. Walling,
Wine and Cider Press.
No 38,706.   Patented May 26, 1863.
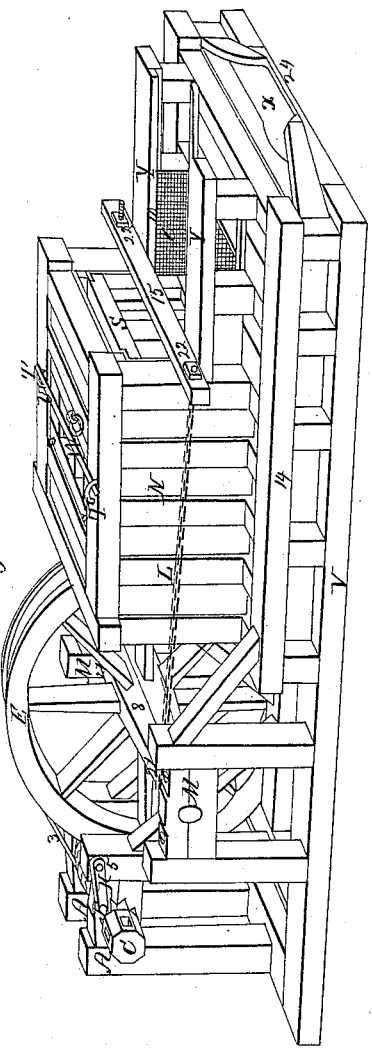
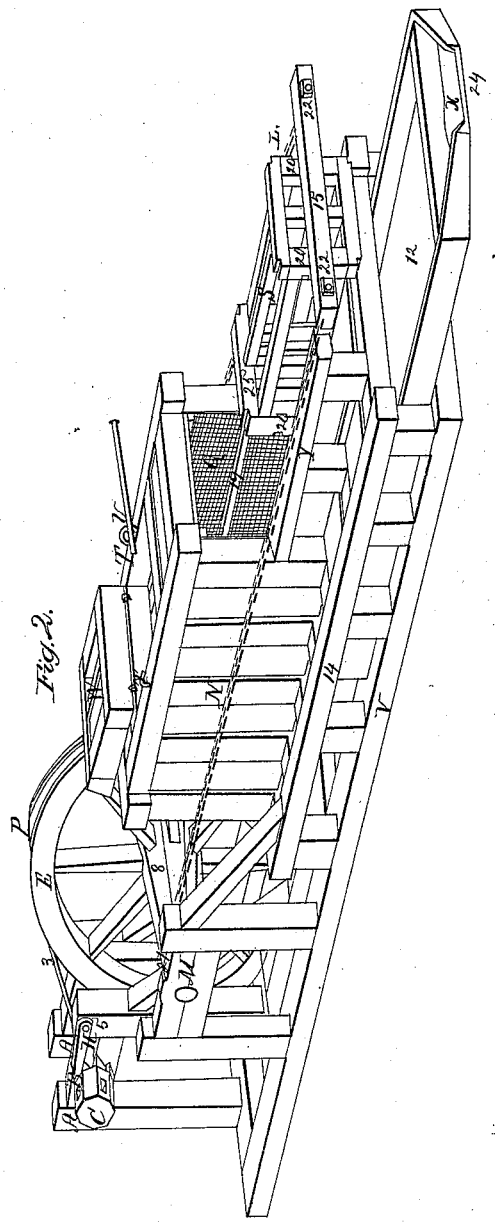
Witnesses:
Wm. P. Walling
Lizzie Walling
Inventor:
Ransom Walling

UNITED STATES PATENT OFFICE.

RANSOM WALLING, OF ROYALTON, OHIO.

IMPROVEMENT IN WINE AND CIDER PRESSES.

Specification forming part of Letters Patent No. 38,706, dated May 26, 1863.

*To all whom it may concern:*

Be it known that I, RANSOM WALLING, of Royalton, in Cuyahoga county, and State of Ohio, have invented a new and useful Improvement in Machines for Pressing Cider or Wine from Pomace or Grapes; and I do hereby declare that the following is a full and exact description thereof, reference being had to the accompanying drawings and letters of reference marked thereon.

This invention relates to a certain improvement in that class of press-machines where the follower is forced horizontally into the chest by means of capstan and wheel connected by chains.

Figure 1 of the accompanying drawings is a perspective view exhibiting the several parts—viz., bed-frame V, shores A A, capstan C, ratchet B, latch H, chain 3, wheel E, shaft 8, shores M M, chains L L, chest N, trap-door W, bolt U, rings T T, follower S, spout X, counter-frame 14, extended frame Y, beam 15.

Fig. 2 is a perspective end view with the follower S removed from chest N, and with vat 12 drawn from between bed-frame V and counter-frame 14, exhibiting parts that cannot be clearly seen in Fig. 1—namely, inside partitions Q Q of chest N, guides 19 19, grooves 20 20. The capstan C is made to revolve in shores A A by means of levers placed in mortises near the ends of capstan C. Said levers are omitted in the drawings. The shores A A are framed to bed-frame V, the latch H is pivoted to shores A A, as seen at numeral 5 in Fig. 1; the wheel E, by means of its shaft 8, rests in shores M M—said shores are framed to bed-frame V; the periphery of wheel E is grooved to admit of chain 3; the chest N and its extended frame Y are framed to the counter-frame 14; said counter-frame is framed to bed-frame V. The chain 3 is firmly attached to capstan C at Z, and to wheel E at P. The chains L L are firmly attached to shaft 8 near its opposite ends, as seen at 21 21 in Fig. 1. The opposite ends of said chains are firmly attached to beam 15 near its opposite ends, as seen at 22 22. The chest N is constructed with inside partitions, Q Q, composed of slats, lined with canvas, of sufficient distance from the body of chest N as to admit of the free passage of the wine or cider to escape into vat 12. The bottom of chest N is also constructed with slats and lined with canvas to serve as filter. Said slats are omitted in the drawings. The follower S is constructed of a frame to which is attached a face-plate of suitable size, as seen at 25, Fig. 2. To fill the space between the inside partitions, Q Q, and the top and bottom of chest N, the lower timbers of follower S are grooved, as seen at 20 20, Fig. 2, to suitable depth to admit of their free passage along guides 19 19. Said guides extend the length of chest N and its extended frame Y firmly attached to the inside of inside partitions, Q Q, and extended frame Y. The beam 15 is firmly bolted to the end of frame of follower S, opposite end from the face-plate, as can be clearly seen in Fig. 1. The vat 12 is of suitable size to underlie the whole of chest N, with spout X of suitable length to the opposite end of vat 12 from chest N, to reach the end of bed-frame V. The vat 12 is of suitable depth to contain the cider or wine until it passes out of spout X into a vessel placed to receive it, as shown in Fig. 1 at 21. Said vat is so constructed as to be easily removed from between bed-frame V and counter-frame 14 for the purpose of cleaning it.

I will now describe the operation of my machine as follows: When the operator wishes to press cider or wine from pomace or grapes, he places the pomace or grapes in chest N by means of trap-door W, which he firmly closes by means of sliding bolt U through rings T T. He then takes hold of the lever heretofore described, and revolves capstan C, which in turn revolves wheel E by means of chain 3. Said wheel revolves its shaft 8 and winds on its ends chains L L, which are fastened at their opposite ends to beam 15, near its ends, as heretofore described, thereby forcing follower S into chest N and pressing the pomace or grapes to back of chest N, forcing the cider or wine through the inside partitions, Q Q, and bottom of chest N, where it is left free to fall below into vat 12, from which it passes through spout X into vessel to receive it, as seen at 24. Only one side of said partitions can be clearly seen, one being opposite the other in chest N. The whole is held in place by means of latch H, that rests in ratchet B. Said ratchet is grooved near the end of capstan C, as seen in Fig. 1. Then to get the follower S back to its former position and the pomace from chest N, as seen in Fig. 2, the operator raises latch H from ratchet B, which leaves capstan C free to revolve. He then takes hold of beam 15 and forces it backward out of chest N by means of grooves 20 20, and their guides 19 19, as seen in Fig. 2. The beam 15 causes shaft 8 and wheel E by means of chains L L, heretofore described, which extend along opposite sides of chest N, to revolve, thereby revolving capstan C, by means of chain 3, back to its former position. He then removes bolt U from rings T T and raises trap-door W, from which he has easy access to the pomace.

After having described my invention, what I claim, and desire to secure by Letters Patent, is—

1. The combination, with chest N, of the follower S and inside partitions, Q Q, arranged to work in joint operation with guides 19 19 and grooves 20 20, for the purpose set forth.

2. In combination with the foregoing, the vat 12 and spout X, connected together as described, and for the purpose specified.

RANSOM WALLING.

Witnesses:
 WM. P. WALLING,
 LIZZIE WALLING.